2,982,762

CONTINUOUS POLYMERIZATION OF N-VINYL LACTAMS

John F. Voeks and Teddy G. Traylor, Concord, Calif., assignors to The Dow Chemical Company, Midland, Mich., a corporation of Delaware No Drawing. Filed July 29, 1957, Ser. No. 674,615

10 Claims. (Cl. 260—88.3)

This invention lies in the field of organic chemistry and contributes especially to the art of polymerization. More particularly, the present invention has reference to a continuous process for the manufacture of polymers and copolymers of N-vinyl lactam monomers, particularly poly-N-vinylpyrrolidone.

Various poly-N-vinyllactams and certain copolymers of N-vinyl lactam monomers with other ethylenically unsaturated monomers are particularly advantageous materials to employ for many of a wide variety of uses. This is particularly the case for poly-N-vinylpyrrolidone and other of the homopolymers of N-vinyl lactams, such as those that have been described in U.S. Letters Patent Nos. 2,265,450 and 2,335,454 as being obtainable from the several N-vinyl lactam monomers, including those disclosed in U.S. Letters Patent No. 2,317,804.

Amongst the many uses for which N-vinyl lactam polymers are especially desirable is their employment as dye-assisting adjuvants for various difficult-to-dye hydrophobic synthetic textile fibers and the like articles, such as those which have been prepared from polymers and copolymers of acrylonitrile. In general, greater advantage may be derived when relatively higher molecular weight polymers are employed in such capacity. For example, in the copending application of Theodore B. Lefferdink, Teddy G. Traylor and Mary Jean Charlesworth for "Acrylic Fibers Having Enhanced Dye-Receptivity," having Serial No. 586,190, which was filed on May 21, 1956, there is set forth the surprising and unexpected benefit of employing vinyl lactam polymers, particularly polyvinylpyrrolidone, as dye-assisting adjuvants for acrylonitrile polymer fibers when the dye-receptors have Fikentscher K-values that are greater than about 40. As is generally understood, the Fikentscher K-value of a polymeric substance is a quantity, as has been defined by Fikentscher in "Cellulosechemie," 13, 60 (1932), that represents an approximate measure of the weight fraction of a given sample of polymer in any infinitesimal molecular weight range. According to a concept that is widely acceptable to those skilled in the art, it may be said to be in correlation, in an exponential manner, to the mean average molecular weight that obtains in a given sample of a polymeric substance.

The conventional techniques that are known and which have been employed for the polymerization of N-vinyl lactam polymers, particularly poly-N-vinylpyrrolidone, involve polymerizing the monomer in an aqueous medium using oxygen-supplying catalysts to assist in the polymerization. Ordinarily, the conventional processes contemplate the manufacture of the desired polymers by batchwise techniques. By way of illustration the ordinary commercial process for preparing poly-N-vinylpyrrolidone involves the batch-wise polymerization of the monomer in water solution using hydrogen peroxide as an initiator. In view of the considerable demands for polymer product that are involved when it is employed as a dye-receptor and for other large volume requirement uses, it would be an advantage to provide a continuous process for the polymerization of N-vinyl lactam monomers so that large quantities of the polymeric product, in high quality form, could be made available in an easy and convenient manner. Difficulty, however, has been encountered in providing suitable methods for the continuous polymerization of N-vinyl lactam polymers, particularly poly-N-vinylpyrrolidone, especially when the polymerization is conducted in an aqueous medium with the conventional oxygen-supplying polymerization initiators or catalysts. Among the reasons which may be considered as being responsible for this are that it may be difficult by continuous techniques to secure polymers having satisfactory high molecular weights or K-values and that, when following the usual procedures, a continuous technique cannot be resorted to because of severe and rapid gelation of the polymer product in the reactor.

This invention has as an object the provision of a satisfactorily operative and exceptionally advantageous continuous process for the polymerization of various polymers and copolymers of N-vinyl lactam monomers, particularly poly-N-vinylpyrrolidone with efficient conversions or yields and greater uniformity of the desired polymer product in suitably high molecular weight ranges without experiencing processing difficulties due to gelation and consequent equipment stoppage or failure.

These objects and other benefits may be realized in accordance with the method of the invention which comprises continuously or in batch volumes preparing an aqueous polymerization vehicle by mixing water with from 0.1 to 95 percent by weight, based on the weight of said vehicle, of a polymerization modifier selected from the group consisting of isopropanol, thioglycolic acid, dimethyl formamide, ethanolamine, methyl ethyl ketone, trichloracetic acid, 2-mercapto ethanol and their mixtures, adding to said modified polymerization vehicle between about 5 and 50 percent by weight, based on the weight of the resulting mixture, of an N-vinyl lactam monomer, particularly vinyl pyrrolidone, or a mixture of a vinyl lactam monomer and up to about 50 percent by weight, based on the total weight of monomer, of another ethylenically unsaturated monomer that is copolymerizable with vinyl lactam monomers; continuously passing said polymerization mixture through a chamber wherein it is mechanically agitated, as through a stirred reaction chamber, and maintained at a temperature between about 25 and 100° C. until at least a portion, preferably at least about 75 percent by weight, of the monomer is converted to polymer; and continuously withdrawing the desired polymer product in said polymerization vehicle from said chamber. Advantageously, a free radical generating catalyst is incorporated in the polymerization vehicle with the monomer in order to initiate and assist in the polymerization or the monomer-containing vehicle is subjected to the influence of other suitable initiators of free radical polymerization for vinyl lactam monomers. Suitable catalysts or initiators for polymerization of the monomer include the azo catalysts, such as azobisisobutyronitrile, peroxygen catalysts, such as hydrogen peroxide and potassium persulfate, and irradiation under the influence of high energy radiation fields. The latter catalyzation may include the various actinic radiations, such as ultraviolet, X-ray and gamma radiations, as well as radiations from radioactive sources such as cobalt 60 and the like. In addition, if desired, beneficial combinations of polymerization catalyzing influences may be utilized pursuant, for example, to the disclosure of Canadian Patent No. 538,071. The particular catalyst that is employed may, in large measure, depend upon the specific modifier being utilized; care being taken that that modifier and catalyst are not chemically reactive with one another. Thus, it is disadvantageous to employ hydrogen peroxide as a catalyst when thioglycolic acid is used as a modifier due to the reactivity encountered between the two.

The greatest benefit may frequently be derived in the practice of the present invention when poly-N-vinylpyrrolidone is being prepared and the polymerization vehicle is made up to contain water and between about 10 and 90 percent by weight, based on the weight of the vehicle, of isopropanol as a modifier and from about 5 to 50 percent by weight, based on the weight of the total polymerization mass, of the N-vinylpyrrolidone monomer is dissolved therein. The polymerization of N-vinyl pyrrolidone in the indicated manner is generally best accomplished when the continuous reaction is conducted at a temperature in the neighborhood of about 70° C. It may oftentimes be beneficial to maintain the polymerization mass under an atmosphere of an inert gas during the polymerization. While the yield per pass in the practice of the present continuous process may vary (depending upon the particular operating conditions employed) it is frequently possible in a single pass of the ingredients through the reactor to convert to the desired polymer product an amount by weight of the monomer that is in the neighborhood of at least about 90 percent. If desired, the polymerization mass may be recycled through the reactor to obtain greater conversions and yields than may be afforded by a single pass therethrough. The polymer product may be recovered from the reaction mass by conventional techniques such as spray drying, solvent stripping to obtain an aqueous solution of the desired polymer product, and so forth.

As is apparent, many types and varieties of apparatus can be employed suitably in the practice of the present invention. As has been indicated, those in which the mechanical agitation of the polymerizing ingredients is effected by mechanical stirrers and the like appliances may generally be utilized with complete satisfaction.

The following examples serve to illustrate how the present invention may be carried out in practice. In the examples, unless otherwise indicated, all parts and percentages are to be taken by weight.

EXAMPLE 1

Into a glass flask having a capacity of about 3050 ml. that was equipped with an efficient agitating mechanism and suitable inlets for the reactants and an outlet for the product, there was continuously fed two feed streams. One stream (designated stream "A") having a total of about 1007 parts by volume was comprised of about 500 parts by volume each of monomeric N-vinyl pyrrolidone and isopropanol, said 1000 parts of the mixture containing about 7 parts by volume of a 28 percent aqueous solution of ammonium hydroxide. The other stream (designated stream "B") consisted of a 0.12 percent aqueous solution of a hydrogen peroxide. Stream "A" was fed at a rate of 190 ml. per hour into the stirred reactor. Stream "B" was fed thereto at a rate of 80 ml. per hour. The total volume of the reactants in the polymerization mass was about 3050 ml. The temperature in the reactor was maintained at about 70° C. Nitrogen was bubbled slowly through the reaction mass which was continuously stirred during its passage through the flask. Under the continuous polymerization conditions of the present invention, about 87 percent of the monomer was converted in a single pass to polymer having a Fikentscher K-value in the range from 45–50. The polymerization continued with no sign of gelation or other operating difficulties. After about 42 hours, the polymerization was terminated. In a similar experiment, operated under substantially the same conditions, the polymerization was continuously performed for 110 hours with no sign of gelation before the reaction was terminated.

By way of contrast, the foregoing experiment was repeated excepting to replace the isopropanol in stream "A" with plain water. In the following tabulation there are set forth the results that were obtained practicing the conventional polymerization in water as well as those, included for comparison, that were achieved in the first-described 42 hour polymerization that was conducted in accordance with the present invention.

Table
COMPARISON OF CONTINUOUS POLYMERIZATIONS OF N-VINYLPYRROLIDONE IN AQUEOUS ISOPROPANOL AND WATER MEDIA

| First Run—In Isopropanol according to the invention: | | | | | |
|---|---|---|---|---|---|
| Running Time, Hours | 4 | 17 | 25 | 32 | 42 |
| Percent Conversion of Monomer to Polymer | 87.5 | 87.5 | 87 | 88 | 88 |
| Fikentscher K Value | 47 | 47 | 46.5 | 47 | 45.5 |
| Subsequent Run in Plain Water: | | | | | |
| Running Time, Hours | 9 | 15 | 16 | | |
| Percent Conversion of Monomer to Polymer | 88 | 89 | 88 gelled[1] | | |
| Fikentscher K Value | 56 | 61 | 67 | | |

[1] Prevented continuation of stirring in reaction chamber.

As is apparent, continuous polymerization in an unmodified aqueous medium according to the conventional techniques was impossible for the reason that after only 16 hours of operation, gelation interfered with the procedure.

EXAMPLE 2

Into a 525 mm. reactor that was fitted with a mechanical stirrer and suitable inlets for the reactants and an outlet for the product, there was pumped a single stream containing about 325 parts of N-vinyl pyrrolidone, 237 parts of isopropanol, 400 parts of water and 2.25 parts of azobisisobutyronitrile. The feed stream was passed into the reactor at a rate of about 425 ml. per hour. The feed stream was maintained at a temperature of about 27° C. and the contents of the reactor in the polymerization zone at a temperature of about 70° C. A conversion of 69 to 70 percent of monomer to polymer having a Fikentscher K-value of from 48 to 50 was continuously obtained during a 21-hour period in which no appreciable gel formation was observed. The polymerization was terminated at the end of this period.

EXAMPLE 3

About a 20 percent aqueous solution of monomeric N-vinyl pyrrolidone containing about 0.1 percent of thioglycolic acid was passed continuously into a stirred reactor having a hold-up volume of about 100 ml. at a rate of about 52 ml. per hour. The reactor was arranged so that the feed stream in the polymerization zone was situated 5 centimeters beneath a Machlett OEG–50 X-ray tube (and subject to the radiations therefrom) that was operated under a potential of 50,000 volts at 50 ma. The conversion during a 12 hour polymerization period was about 88 percent, with the polymer being obtained having an average Fikentscher K-value of about 62.5.

In a similar experiment wherein the polymerization was performed in water without the thioglycolic acid being present and using a 10 percent solution of the monomeric N-vinyl pyrrolidone, only about 80 percent conversion was achieved. The Fikentscher K-value of the product was less than 61. The polymerization had to be terminated after 9 hours due to apparatus and process-interfering gelation in the reactor.

Similar results may be obtained when the foregoing is repeated in order to polymerize other N-vinyl lactam monomers, including N-vinyl caprolactam, N-vinyl piperidone, N-vinyl-5-methyl pyrrolidone and their mixtures with one another and with N-vinylpyrrolidone. Similar results may also be obtained when the N-vinyl lactam monomer is polymerized in admixture with other polymerizable compounds containing one or more omega-methyl groups, such as acrylic acid and its derivatives and homologs including various acrylic esters, methacrylonitrile and such unsaturated ketones as vinyl methyl ketone and such other ethylenically unsaturated monomers as vinyl chloride, styrene, vinyl acetate and the like that copolymerizable with N-vinyl lactam monomers. Analogous good results may also be achieved when the foregoing is repeated excepting to vary the proportions of the specifically illustrated modifiers within the specified ranges or to replace them accordingly with other of the modifiers mentioned as being within the scope of the invention.

What is claimed is:

1. Method of continuously polymerizing N-vinyl lactam monomers into polymers which comprises preparing an aqueous polymerization vehicle by mixing water with from 0.1 to 95 percent by weight, based on the weight of said vehicle, of a polymerization modifier selected from the group consisting of isopropanol, thioglycolic acid, dimethyl formamide, ethanolamine, methyl ethyl ketone, trichloroacetic acid, 2-mercapto ethanol and their mixtures; adding to said modified polymerization vehicle between about 5 and 50 percent by weight, based on the weight of the resulting mixture, of a polymerizable ethylenically unsaturated monomeric constituent that consists of at least about 80 percent by weight, based on the total weight of monomer, of an N-vinyl lactam monomer; continuously passing said polymerization mixture through a chamber; continuously subjecting said mixture in said chamber to the action of an initiator of free radical polymerization for N-vinyl lactam monomers; mechanically agitating said mixture in said chamber and maintaining it therein at a temperature between about 25 and 100° C. until at least a portion of the monomer is converted to polymer; and continuously withdrawing the desired polymer product in said polymerization vehicle from said chamber.

2. The method of claim 1, wherein said polymerization mixture is maintained in said chamber until at least about 75 percent by weight of said monomer is converted to from said chamber.

3. The method of claim 1, wherein said polymerization vehicle is continuously prepared and said monomeric constituent is continuously added thereto.

4. The method of claim 1, wherein said monomeric mixture in said polymerization vehicle is subjected to the action of a free radical generating catalyst that has been added to said polymerization mixture.

5. The method of claim 1, wherein said monomeric mixture in said polymerization vehicle is subjected to the polymerizing influence of a field of high energy radiation.

6. The method of claim 1, wherein said monomer consists entirely of at least one N-vinyl lactam monomer.

7. The method of claim 1, wherein said monomer is N-vinyl pyrrolidone.

8. The method of claim 1, wherein said monomer is N-vinyl caprolactam.

9. The method of claim 1, wherein said polymerization vehicle is made up to contain water and between about 90 and 10 percent by weight, based on the weight of the vehicle, of isopropanol and wherein between about 5 and 50 percent by weight, based on the weight of the resulting mixture, of monomeric N-vinyl pyyrolidone is incorporated in said vehicle prior to continuous polymerization of said monomer.

10. The method of claim 1, wherein said polymerization mixture is maintained at a temperature of about 70° C. while passing through said chamber.

References Cited in the file of this patent

FOREIGN PATENTS 722,790    Great Britain _____ Jan. 26, 1955

OTHER REFERENCES

Radiation Applications, March 1955, pp. 2 and 3.

UNITED STATES PATENT OFFICE
CERTIFICATE OF CORRECTION

Patent No. 2,982,762                                            May 2, 1961

John F. Voeks et al.

It is hereby certified that error appears in the above numbered patent requiring correction and that the said Letters Patent should read as corrected below.

Column 5, line 37, for "from said chamber" read -- polymer --.

Signed and sealed this 27th day of February 1962.

(SEAL)
Attest:

ERNEST W. SWIDER
Attesting Officer

DAVID L. LADD
Commissioner of Patents